(12) United States Patent
Osaki et al.

(10) Patent No.: US 12,511,036 B2
(45) Date of Patent: *Dec. 30, 2025

(54) INFORMATION PROCESSING SYSTEM, INFORMATION PROCESSING METHOD, AND STORAGE MEDIUM STORING INFORMATION PROCESSING PROGRAM

(71) Applicant: SHARP KABUSHIKI KAISHA, Sakai (JP)

(72) Inventors: Yosuke Osaki, Sakai (JP); Satoshi Terada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 208 days.

This patent is subject to a terminal disclaimer.

(21) Appl. No.: 18/210,727

(22) Filed: Jun. 16, 2023

(65) Prior Publication Data

US 2023/0325074 A1    Oct. 12, 2023

Related U.S. Application Data

(63) Continuation of application No. 17/179,668, filed on Feb. 19, 2021, now Pat. No. 11,720,246.

(30) Foreign Application Priority Data

Mar. 5, 2020   (JP) .................. 2020-037610

(51) Int. Cl.
*H04L 29/06*    (2006.01)
*G06F 3/04886*    (2022.01)
(Continued)

(52) U.S. Cl.
CPC .......... *G06F 3/04886* (2013.01); *G06F 21/62* (2013.01); *G06K 7/1417* (2013.01); *G06F 21/6245* (2013.01)

(58) Field of Classification Search
CPC ..................................................... G06F 21/62
See application file for complete search history.

(56) References Cited

U.S. PATENT DOCUMENTS 11,030,299 B1 *  6/2021  Ilincic ..................... G06F 21/45
2010/0017889 A1   1/2010  Newstadt et al.
(Continued)

FOREIGN PATENT DOCUMENTS

| JP | 2009-086843 A | 4/2009 |
| JP | 2015-122014 A | 7/2015 |
| JP | 5995341 B1 | 9/2016 |

OTHER PUBLICATIONS

Non-final Rejection issued on Jul. 7, 2022 for U.S. Appl. No. 17/179,668.
(Continued)

Primary Examiner — Jason K Gee
(74) Attorney, Agent, or Firm — ScienBiziP, P.C.

(57) ABSTRACT

An information processing system includes a display controller that causes a display device to display a first input field in which predetermined information can be input, and an input information acquirer that acquires the predetermined information input by a user terminal when the user terminal becomes communicable. The display controller displays the predetermined information acquired by the input information acquirer in the first input field.

10 Claims, 7 Drawing Sheets

(51) Int. Cl.
*G06F 21/62* (2013.01)
*G06K 7/14* (2006.01)

(56) References Cited

U.S. PATENT DOCUMENTS

| | | |
|---|---|---|
| 2013/0124855 A1* | 5/2013 | Varadarajan ............ G07F 19/20 |
| | | 726/4 |
| 2013/0167208 A1 | 6/2013 | Shi |
| 2013/0185815 A1 | 7/2013 | Leotsarakos |
| 2013/0219479 A1* | 8/2013 | DeSoto .............. G06Q 20/4014 |
| | | 726/6 |
| 2015/0181050 A1 | 6/2015 | Nishii |
| 2016/0191506 A1* | 6/2016 | Wang ...................... H04L 63/18 |
| | | 726/7 |

OTHER PUBLICATIONS

Final Rejection issued on Dec. 7, 2022 for U.S. Appl. No. 17/179,668.
Notice of Allowance and Fees Due issued on Mar. 21, 2023 for U.S. Appl. No. 17/179,668.
Notice of Reasons for Refusal issued on May 30, 2023 for corresponding Japan Patent Application No. 2020-037610 in Japanese and English.

* cited by examiner

| FILE ID | AUTHORIZED ID | PASSWORD |
|---------|---------------|----------|
| F001 | U001 | abcd001 |
| F002 | U002 | bcde002 |
| F003 | ALL | cdef003 |
| ... | ... | ... |

| INPUT FORM | |
|---|---|
| ID | U001 |
| PASSWORD | abcd001 |

CANCEL  OK

INFORMATION PROCESSING SYSTEM, INFORMATION PROCESSING METHOD, AND STORAGE MEDIUM STORING INFORMATION PROCESSING PROGRAM

INCORPORATION BY REFERENCE

The present application is a continuation application of U.S. patent application Ser. No. 17/179,668, filed on Feb. 19, 2021, which claims priority from Japanese Application 2020-037610 filed on Mar. 5, 2020, the content of which is hereby incorporated by reference into this application.

BACKGROUND

Field of the Invention

The present disclosure relates to an information processing system, an information processing method, and a storage medium storing an information processing program.

Description of the Background Art

Conventionally, in a conference in which a plurality of users (conference participants) participate, there has been used a conference system, which can display a conference material (file) on a touch panel display provided in a conference room, and allows the plurality of users to view the material or write information to the material.

Meanwhile, in a case where a password is set for the file in the conference or the like, a user operates an input such as a software keyboard displayed on the touch panel display, and inputs the password in an input field displayed on the touch panel display, during the conference. In this case, there is a problem that predetermined information such as the password leaks to another conference participant.

SUMMARY

An object of the present disclosure is to provide an information processing system, an information processing method, and a storage medium that stores an information processing program capable of inputting predetermined information into an input field of a touch panel display while preventing leakage of the predetermined information input into the input field.

An information processing system according to an aspect of the present disclosure includes a display controller that causes a display device to display a first input field in which predetermined information can be input, and an input information acquirer that acquires the predetermined information input on a user terminal when the user terminal becomes communicable, wherein the display controller displays the predetermined information acquired by the input information acquirer in the first input field.

An information processing method according to another aspect of the present disclosure includes causing a display device to display a first input field to which predetermined information can be input, acquiring the predetermined information input on a user terminal when the user terminal becomes communicable, and in the display control, displaying the predetermined information acquired in the input information acquisition in the first input field.

In a storage medium that stores an information storage program according to another aspect of the present disclosure, the information storage program is a program that causes one or more processors to cause a display device to display a first input field to which predetermined information can be input, acquire the predetermined information input on a user terminal when the user terminal becomes communicable, and in the display control, display the predetermined information acquired in the input information acquisition in the first input field.

According to the present disclosure, it is possible to input predetermined information into an input field of a touch panel display while preventing leakage of the predetermined information input into the input field.

This summary is provided to introduce a selection of concepts in a simplified form that are further described below in the detailed description with reference where appropriate to the accompanying drawings. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. Note that the following embodiments are examples that embody the present disclosure, and do not limit the technical scope of the present invention.

Figure 1:
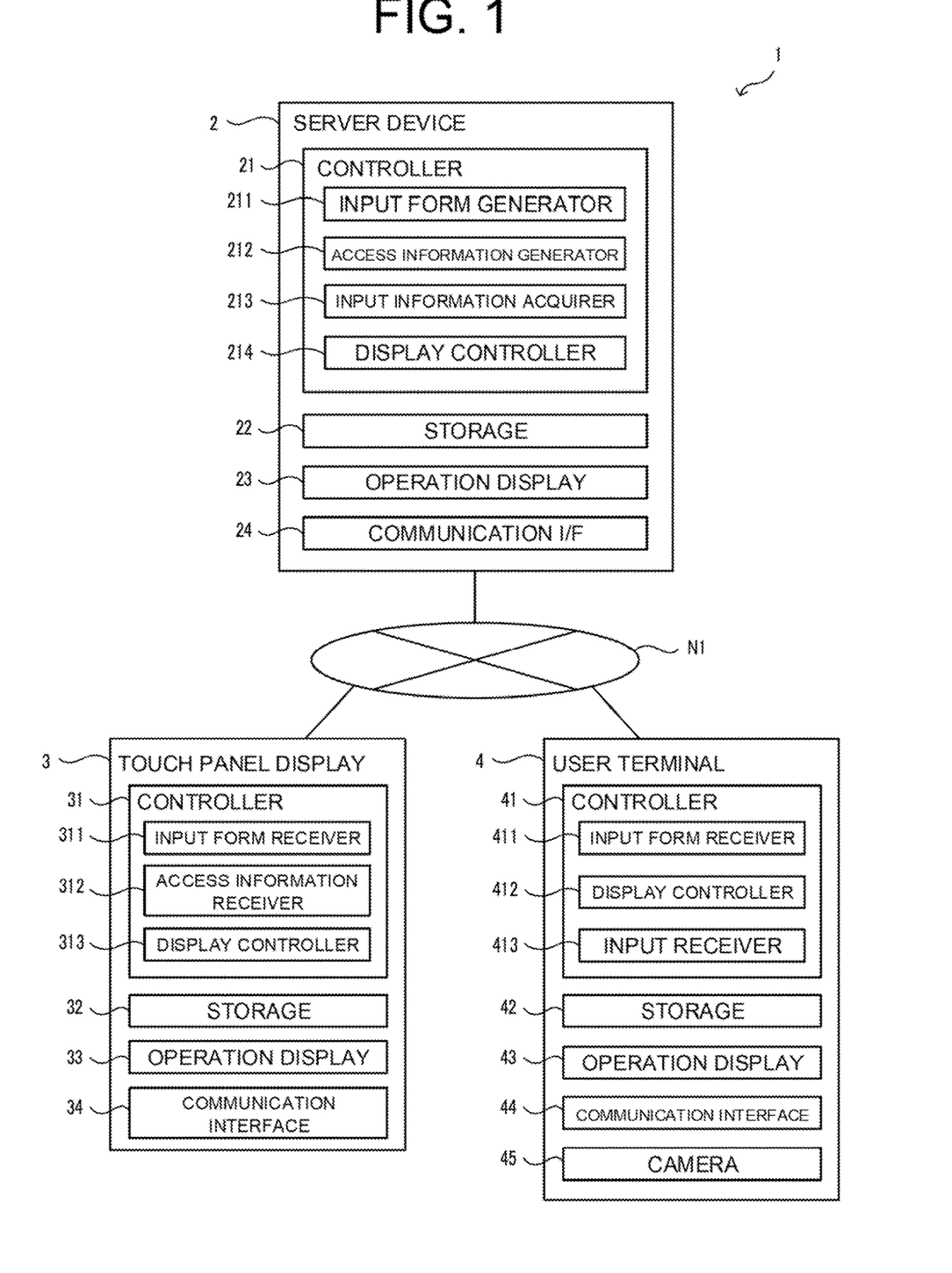
FIG. 1 is a functional block diagram illustrating a configuration of an information processing system according to an embodiment of the present disclosure.

The information processing system according to the present disclosure can be applied to, for example, a conference in which one or more users participate in one location (conference room). FIG. 1 is a diagram illustrating a schematic configuration of an information processing system 1 according to an embodiment of the present invention. The information processing system 1 according to the present embodiment is an example of an information processing system according to the present invention.

The information processing system 1 includes a touch panel display 3 that can display a material (file) used for a conference and allow the participants of the conference to write information, a user terminal 4 possessed by each of the participants of the conference, and a server device 2 that can control the touch panel display 3 and the user terminal 4. The touch panel display 3 and the user terminal 4 are arranged in, for example, the conference room. The server device 2 may be located inside or outside of the conference room.

Server Device 2

The server device 2 includes a controller 21, a storage 22, an operation display 23, a communication interface 24, and the like. The server device 2 may be, for example, an information processing device such as a tablet terminal or a personal computer. Further, the various types of processing executed by the server device 2 may be executed by one or more processors in a distributed manner.

The communication interface 24 is a communication interface that connects the server device 2 to a communication network N1 in a wired or wireless manner, and executes data communication in accordance with a predetermined communication protocol with an external device such as the touch panel display 3, the user terminal 4, and the like via the communication network N1.

The operation display 23 is a user interface, which includes a display such as a liquid crystal display or an organic electroluminescence (EL) display for displaying various kinds of information, and an operator such as a mouse, a keyboard, or a touch panel for receiving an operation.

Figure 2:
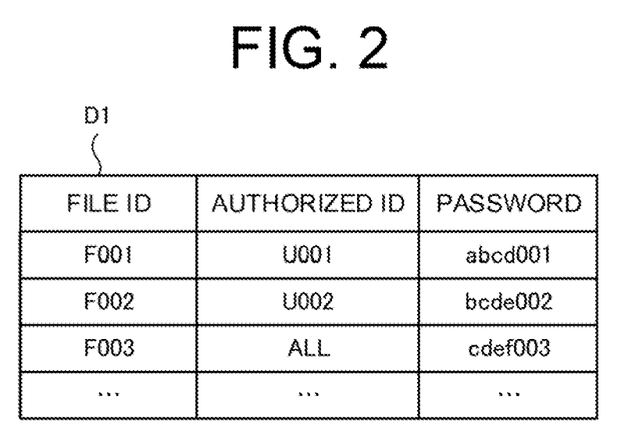
FIG. 2 is a diagram illustrating an example of file information used in the information processing system according to the embodiment of the present disclosure.

The storage 22 is a non-volatile storage, such as a hard disk drive (HDD) or a solid state drive (SSD), that stores various kinds of information. Specifically, the storage 22 includes file information D1. FIG. 2 is a diagram illustrating an example of the file information D1.

As illustrated in FIG. 2, the file information D1 includes information related to a file (file information) to be used in a conference. Information such as "file ID", "authorized user ID", and "password" is registered in the file information D1 for each file. The file ID is identification information for a file. The authorized user ID is identification information for a user who has an access authority to a file. For example, since the creator who created a file has an access authority for the file, the ID of the creator is registered in the authorized user ID. Further, when the creator gives a file access authority for a file to a participant of a conference, for example, the ID of the participant is registered in the authorized user ID. The "password" is decryption information required for opening a file, and is set by, for example, the creator of the file.

Further, the storage 22 stores conference information, user information, file data, and the like. Information (schedule information) such as a conference ID, a conference name, a conference room ID, a start date and time, an end date and time, a participant ID, and a file ID is registered in the conference information. For example, personal information such as user IDs, user names, affiliations, and e-mail addresses of all employees of a business office is registered in the user information. File data may be stored in a file server (such as a cloud server) connected to the server device 2 via the communication network N1. For example, a user sets an arbitrary password for a material (file), and uploads the material to the storage 22 or the file server, by using his/her own personal computer.

In a conference, when a user (a participant of the conference) desires to display a material on the touch panel display 3, the user accesses the storage 22 or the file server, and selects a file of the material. Then, the user inputs the ID (authorized user ID) and the password set for the file by an input method described later. When the ID and the password match, the controller 21 displays the material on the touch panel display 3.

Further, the storage 22 also stores the data for input pages (see FIGS. 3, 4, and the like) displayed on the touch panel display 3 and the user terminal 4.

Furthermore, the storage 22 stores a control program such as an information input program for causing the controller 21 to execute information input processing (see FIG. 6) to be described later. For example, the information input program is recorded in a computer-readable recording medium, such as universal serial bus (USB) memory, compact disc (CD) or digital versatile disc (DVD), in a non-transitory manner. The information input program stored in the non-transitory manner is stored in the storage 22 by being read by a reading device (not illustrated) such as a USB reader, a CD drive, or a DVD drive electrically connected to the server device 2. Further, the information input program may be stored in the storage 22 by being downloaded from a server accessible from the server device 2.

The controller 21 includes a control device such as a central processing unit (CPU), a read only memory (ROM), and a random access memory (RAM). The CPU is a processor that executes various types of arithmetic processing. The ROM is a non-volatile storage in which a control program such as a basic input/output system (BIOS) and an operation system (OS) for causing the CPU to execute various types of arithmetic processing is stored in advance. The RAM is a volatile or non-volatile storage that stores various kinds of information, and is used as a temporary storage memory (working area) for various types of processing executed by the CPU. The controller 21 controls the server device 2 by executing various types of control programs stored in the ROM or the storage 22 in advance by the CPU.

More specifically, the controller 21 includes various types of processors such as an input form generator 211, an access information generator 212, an input information acquirer 213, and a display controller 214. Note that the controller 21 functions as the input form generator 211, the access information generator 212, the input information acquirer 213, and the display controller 214 by executing various types of processing in accordance with the information input program by the CPU. Further, a part or all of the processors in the controller 21 may be configured by an electronic circuit. Note that the information input program may be a program for causing a plurality of processors to function as the various types of processors.

The input form generator 211 generates an input form F1 (an example of a first input field of the present disclosure) for inputting input information (an example of predetermined information of the present disclosure) such as a user ID and a password. For example, when the input form generator 211 detects an access to the file to which the password is set, the input form generator 211 generates the input form F1. For example, when a conference participant (user A (user ID: "U001")) operates the touch panel display 3, and selects a file X (file ID: "F001"), the input form generator 211 detects the selection operation, and generates the input form F1.

Figure 3:
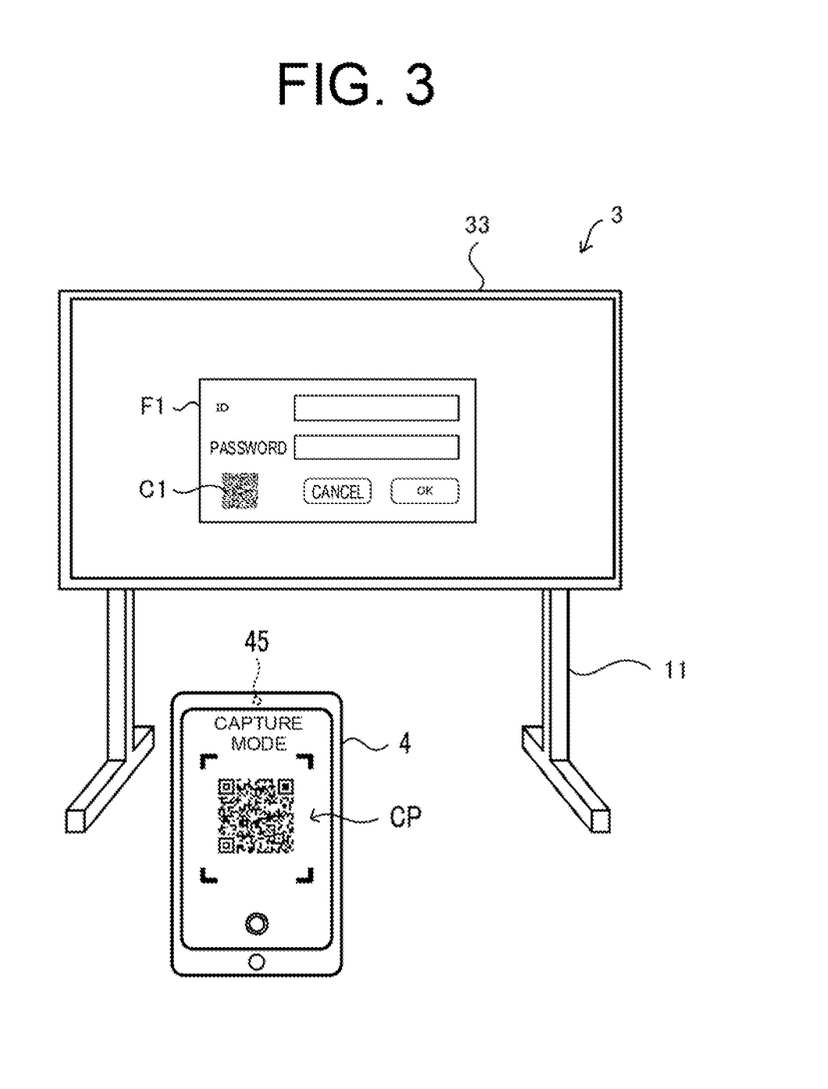
FIG. 3 is a diagram illustrating an example of display screens of a touch panel display and a user terminal according to the embodiment of the present disclosure.

The display controller 214 transmits the data of the web page showing the generated input form F1 to the touch panel display 3, and causes an operation display 33 to display the input form F1. As a result, as illustrated in FIG. 3, the input form F1 is displayed on the operation display 33 of the touch panel display 3. When the input form F1 is displayed on the touch panel display 3, the user A operates the operation display 33 (for example, the touch panel), thereby being capable of inputting a user ID and a password. Further, the input form generator 211 generates an input form F2 (an example of a second input field of the present disclosure) to be displayed on the user terminal 4. The display controller 214 transmits the data of the web page showing the generated input form F2 to the user terminal 4, and displays the input form F2 on the operation display 43.

The access information generator 212 generates access information for accessing the input form F1. The access information is, for example, a two-dimensional code C1 including the URL for the web page (link destination page) corresponding to the input form F1. For example, when the access information generator 212 detects an access to the file to which the password is set, the access information generator 212 generates the two-dimensional code C1. For example, when the user A operates the touch panel display 3, and selects the file X, the access information generator 212 detects the selection operation, and generates the two-dimensional code C1.

The display controller 214 transmits the data of the generated two-dimensional code C1 to the touch panel display 3, and causes the operation display 33 to display the two-dimensional code C1. As a result, as illustrated in FIG. 3, the two-dimensional code C1 is displayed on the operation display 33 of the touch panel display 3.

Figure 4:
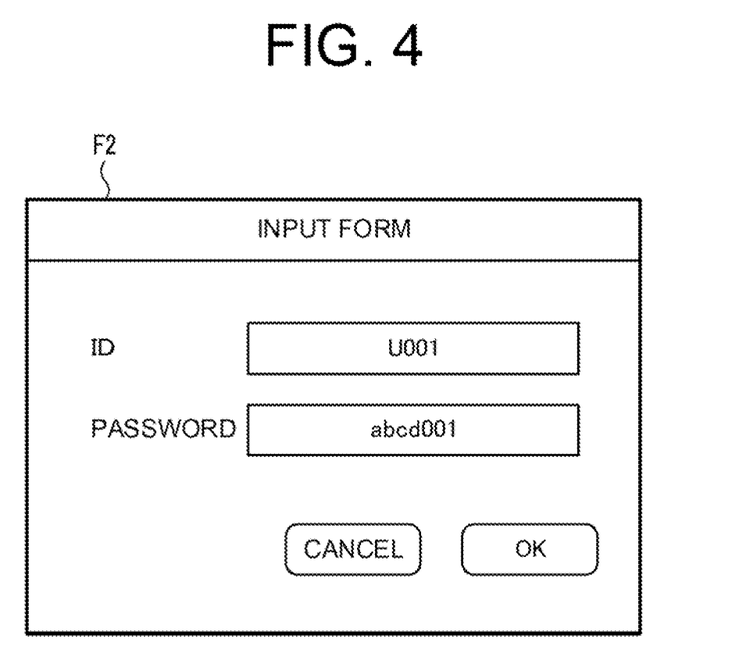
FIG. 4 is a diagram illustrating an example of the display screen of the user terminal according to the embodiment of the present disclosure.

Although the details will be described later, when the two-dimensional code C1 displayed on the touch panel display 3 is read by the user terminal 4 of the user A, and the URL included in the two-dimensional code C1 is accessed, the display controller 214 transmits the data of the web page for displaying the input form F2 on the user terminal 4. As a result, as illustrated in FIG. 4, the input form F2 is displayed on the operation display 43 of the user terminal 4. That is, the display controller 214 causes the user terminal 4 to display the input form F2 for inputting a user ID and a password on the web page. When the input form F2 is displayed on the user terminal 4 of the user A, the user A can operate the user terminal 4 to input a user ID and a password.

The input information acquirer 213 acquires input information to be input into the input form F1. For example, when a user ID and a password are input into the input form F1 displayed on the touch panel display 3, the input information acquirer 213 acquires the user ID and the password. However, when it is necessary to prevent the leakage of the user ID and the password, the input information acquirer 213 acquires the user ID and the password input on the user terminal 4 when the user terminal 4 becomes communicable. Note that the input information acquirer 213 may prohibit the operation of inputting a user ID and a password into the input form F1 displayed on the touch panel display 3. For example, when the user terminal 4 accesses the web page that displays the input form F2 on the basis of the two-dimensional code, and the user inputs a user ID and a password in the input form F2 displayed on the user terminal 4, the input information acquirer 213 acquires the user ID and the password.

The display controller 214 executes display processing of causing the touch panel display 3 and the user terminal 4 to display various kinds of information. For example, when the user inputs a user ID and a password into the input form F2 displayed on the user terminal 4, the display controller 214 displays the user ID and the password acquired by the input information acquirer 213 in the input form F1.

As described above, the server device 2 can communicate with each of the touch panel display 3 and the user terminal 4. Thereafter, when the server device 2 is accessed from the user terminal 4 on the basis of the two-dimensional code C1, the server device 2 displays the input form F2 (web page) on the user terminal 4, receives the input of a user ID and a password, and displays the received user ID and password in the input form F1 of the touch panel display 3.

Touch Panel Display 3

As illustrated in FIG. 1, the touch panel display 3 includes a controller 31, a storage 32, the operation display 33, and a communication interface 34, and the like. The touch panel display 3 may be an information processing device such as a tablet terminal or a personal computer. The touch panel display 3 is an example of a display device of the present invention.

The communication interface 34 is a communication interface that connects the touch panel display 3 to the communication network N1 in a wired or wireless manner, and executes data communication in accordance with a predetermined communication protocol with an external device such as the server device 2 via the communication network N1.

The operation display 33 is a user interface, which includes a display such as a liquid crystal display or an organic EL display for displaying various kinds of information, and a touch panel for receiving a touch operation.

The storage 32 is a non-volatile storage, such as an HDD, an SSD, or a flash memory, for storing various kinds of information. For example, the storage 32 stores a control program such as a browser program. Specifically, the browser program is a control program for causing the controller 31 to execute communication processing with an external device such as the server device 2 in accordance with a communication protocol such as Hypertext Transfer Protocol (HTTP).

The controller 31 includes a control device such as a CPU, a ROM, and a RAM. The CPU is a processor that executes various types of arithmetic processing. The ROM is a non-volatile storage in which a control program such as a BIOS and an OS for causing the CPU to execute various types of processing is stored in advance. The RAM is a volatile or non-volatile storage that stores various kinds of information, and is used as a temporary storage memory (working area) for various types of processing executed by the CPU. The controller 31 controls the touch panel display 3 by executing various control programs stored in advance in the ROM or the storage 32 by the CPU.

Specifically, the controller 31 includes various processors such as an input form receiver 311, an access information receiver 312, and a display controller 313. Note that the controller 31 functions as the input form receiver 311, the access information receiver 312, and the display controller 313 by executing various types of processing according to the control program by the CPU. Further, a part or all of the processors in the controller 31 may be configured by an electronic circuit. Note that the control program may be a program for causing a plurality of processors to function as the various processors.

The input form receiver 311 receives the input form F1 transmitted from the server device 2. When the input form receiver 311 receives the input form F1, the display controller 313 causes the operation display 33 to display the web page for the input form F1 (see FIG. 3). The controller 31 can receive an input operation to the input form F1 on the operation display 33. Further, the controller 31 can execute browser processing for inputting an input operation on the operation display 33 into the server device 2.

The access information receiver 312 receives the access information (two-dimensional code C1) transmitted from the server device 2. When the access information receiver 312 receives the two-dimensional code C1, the display controller 313 causes the operation display 33 to display the two-dimensional code C1 (see FIG. 3). The display controller 313 displays the input form F1 and the two-dimensional code C1 in association with each other on the operation display 33.

Further, the controller 31 receives various user operations on the operation display 33. For example, the controller 31 receives a selection operation for a user to select a file of a material for a conference, a handwriting operation of a user on a material displayed on the operation display 23, a search operation for accessing a search site through the Internet and searching for predetermined information, and the like.

User Terminal 4

As illustrated in FIG. 1, the user terminal 4 includes a controller 41, a storage 42, an operation display 43, a communication interface 44, a camera 45, and the like. The user terminal 4 is an information processing device such as a mobile phone, a smartphone, or a tablet terminal. Each participant of the conference possesses the user terminal 4.

The camera 45 is a digital camera, which captures an image of access information (two-dimensional code C1) that is a subject, and outputs the image as digital image data.

The communication interface 44 is a communication interface that connects the user terminal 4 to the communication network N1 in a wired or wireless manner, and executes data communication in accordance with a predetermined communication protocol with an external device such as the server device 2 via the communication network N1.

The operation display 43 is a user interface, which includes a display such as a liquid crystal display or an organic EL display for displaying information such as various web pages, and an operator such as a mouse, a keyboard, or a touch panel for receiving an operation.

The storage 42 is a non-volatile storage such as a flash memory that stores various kinds of information. The storage 42 stores a control program for causing the controller 41 to execute various types of processing.

The controller 41 includes a control device such as a CPU, a ROM, and a RAM. The CPU is a processor that executes various types of arithmetic processing. The ROM is a non-volatile storage in which a control program such as a BIOS and an OS for causing the CPU to execute various types of processing is stored in advance. The RAM is a volatile or non-volatile storage that stores various kinds of information, and is used as a temporary storage memory (working area) for various types of processing executed by the CPU. The controller 41 controls the user terminal 4 by executing various control programs stored in the ROM or the storage 42 in advance by the CPU.

Specifically, the controller 41 includes various processors such as an input form receiver 411, a display controller 412, and an input receiver 413. Note that the controller 41 functions as the input form receiver 411, the display controller 412, and the input receiver 413 by executing various types of processing according to the control program by the CPU. Further, a part or all of the processors in the controller 41 may be configured by an electronic circuit. Note that the control program may be a program for causing a plurality of processors to function as the various processors.

The input form receiver 411 receives the input form F2 transmitted from the server device 2. For example, when a user moves the camera 45 over the two-dimensional code C1 displayed on the touch panel display 3 (see FIG. 3), the controller 41 reads the two-dimensional code C1 and acquires the URL. The display controller 412 causes the operation display 43 to display the acquired URL. When the user selects the displayed URL, the controller 41 receives the selection operation and accesses the URL. For example, the URL is a link destination address for the web page corresponding to the input form F2 stored in the storage 22 of the server device 2.

When the controller 41 accesses the URL, the input form receiver 411 receives the web page for the input form F2 transmitted from the server device 2. When the input form receiver 411 receives the web page for the input form F2, the display controller 412 causes the operation display 43 to display the web page (see FIG. 4). The input receiver 413 can receive an input operation to the input form F2 on the operation display 43. Further, the input receiver 413 can execute browser processing for inputting an input operation on the operation display 43 to the server device 2. That is, the controller 41 accesses the web page by reading the two-dimensional code C1.

For example, as illustrated in FIG. 4, the user inputs a user ID and a password in the input form F2. Note that the display controller 412 may display an input key (software keyboard) corresponding to an attribute of a character to be input into the input form F2. For example, when the attribute of the character is alphanumeric, the display controller 412 displays an input key for alphanumeric. Further, the display controller 412 may display a plurality of input fields in a scrollable manner when the input form F2 includes the plurality of input fields. When the user inputs the user ID and the password and presses the OK button (see FIG. 5), the input receiver 413 transmits the user ID and the password to the server device 2.

Here, in the input form F1 displayed on the touch panel display 3 and the input form F2 displayed on the user terminal 4, at least the input fields for inputting the input information are the same. The input form F1 and the input form F2 are associated with each other. Therefore, the user ID input in the ID input field of the input form F2 is displayed (reflected) in the ID input field of the input form F1. Further, the password input in the password input field of the input form F2 is displayed (reflected) in the password input field of the input form F1. Furthermore, in the input form F1 and the input form F2, the background image, and the display form (character font, color, size, and the like) may be the same.

Figure 5:
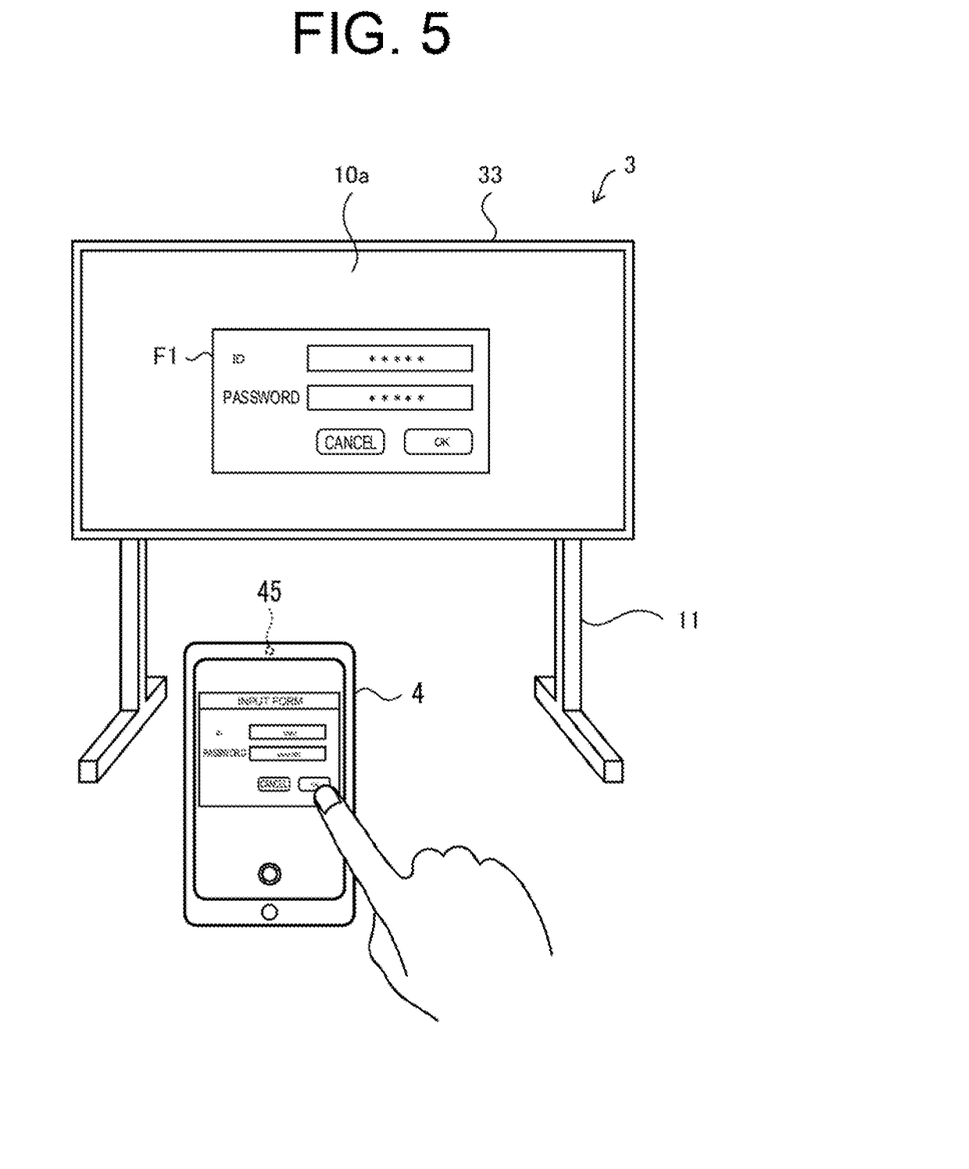
FIG. 5 is a diagram illustrating an example of display screens of the touch panel display and the user terminal according to the embodiment of the present disclosure.

When the input information acquirer 213 in the server device 2 acquires the user ID and the password input by the user terminal 4, the display controller 214 displays the user ID and the password in the input form F1 of the touch panel display 3. At this time, as illustrated in FIG. 5, the display controller 214 causes the operation display 33 in the touch panel display 3 to display the user ID and the password in a display mode in which another user cannot recognize the user ID and the password. For example, the display controller 214 converts the user ID and the password into specific characters and either displays the converted user ID and password (see FIG. 5), hides the user ID and the password, or masks the user ID and the password and displays the masked user ID and password. Further, the display controller 214 may display the input information in the input form F2 of the user terminal 4 and the input form F1 of the touch panel display 3 so as to follow (interlock with) the input operation of the user ID and the password on the user terminal 4.

Information Input Processing

Figure 6:
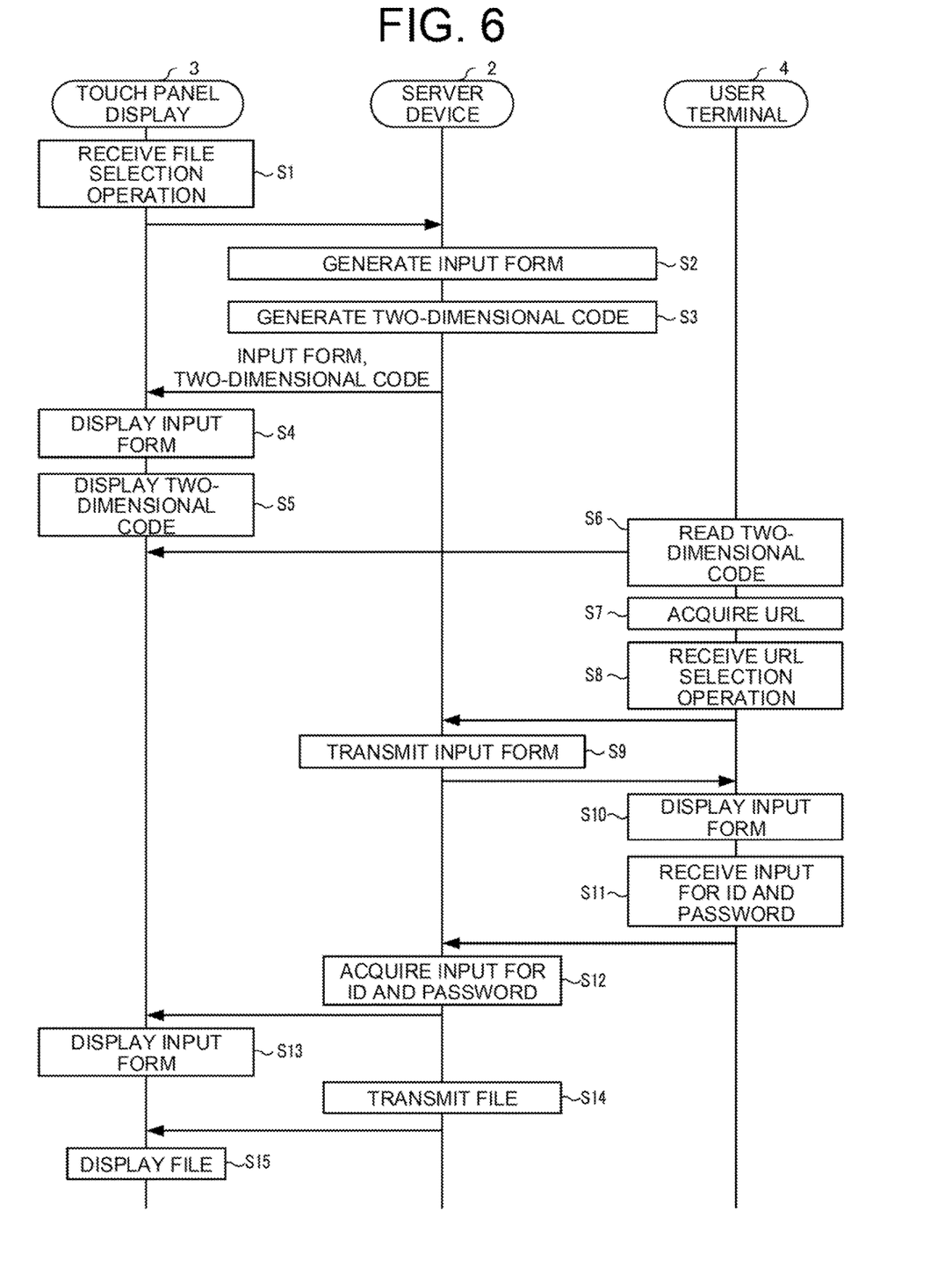
FIG. 6 is a flowchart for explaining an example of a procedure of information input processing executed by the information processing system according to the embodiment of the present disclosure.

Hereinafter, an example of the procedure of the information input processing executed in the information processing system 1 will be described with reference to FIG. 6.

Note that the present disclosure can be regarded as an invention of an information input method (an example of an information processing method of the present disclosure) for executing one or more steps included in the information input processing. Further, one or more steps included in the information input processing described here may be omitted as appropriate. Furthermore, the execution order of each step in the information input processing may be different within a range in which the same effect is produced. Further, an example will be described in which each step in the information input processing is performed by the controller 21 in the server device 2, the controller 31 in the touch panel display 3, and the controller 41 in the user terminal 4, which are included in the information processing system 1. However, in another embodiment, each step in the information input processing may be performed in a distributed manner by one or more processors.

First, in step S1, the controller 31 in the touch panel display 3 receives an operation for selecting a file from a user. For example, the user A, who is a participant in a conference (user ID: "U001"), operates the touch panel display 3 to select the file X (file ID: "F001"), the controller 31 receives the operation, and transmits the operation information to the server device 2.

Next, in step S2, when the controller 21 in the server device 2 acquires the operation information from the touch panel display 3, the controller 21 generates the input form F1 for inputting the user ID and the password set to the file X. Step S2 is an example of a display control step of the present disclosure.

In step S3, the controller 21 generates a two-dimensional code C1 (access information) for accessing the input form F1. The two-dimensional code C1 includes, for example, the URL for the web page (link destination page) corresponding to the input form F1. The controller 21 transmits the data of the input form F1 (web page) and the two-dimensional code C1, which are generated, to the touch panel display 3.

Next, when the controller 31 in the touch panel display 3 receives the input form F1 and the two-dimensional code C1, the controller 31 causes the operation display 33 (for example, the touch panel) to display the input form F1 and the two-dimensional code C1 (see FIG. 3).

Next, the user performs a reading operation for reading the two-dimensional code C1 displayed on the touch panel display 3 by the user terminal 4 (see FIG. 3). Accordingly, the controller 41 in the user terminal 4 reads the two-dimensional code C1 (step S6), and acquires the URL (step S7).

In step S8, the controller 41 displays the acquired URL on the operation display 43 in the user terminal 4 to receive a selection operation for the URL from the user. When the controller 41 receives the selection operation for the URL from the user, the controller 41 transmits the operation information to the server device 2.

In step S9, when the controller 21 in the server device 2 acquires the operation information from the user terminal 4, the controller 21 transmits the data of the input form F2 (web page) to the user terminal 4.

In step S10, when the controller 41 in the user terminal 4 receives the input form F2, the controller 41 causes the operation display 43 to display the input form F2 (see FIG. 4).

In step S11, the controller 41 in the user terminal 4 receives the input of the user ID and the password from the user in the input form F2. When the user inputs the user ID and the password into the input form F2 (see FIGS. 4 and 5), the controller 41 receives the input operation, and transmits the user ID and the password to the server device 2. Step S11 is an example of an input information acquisition step of the present disclosure.

In step S12, the controller 21 in the server device 2 acquires the user ID and the password from the user terminal 4. The controller 21 transmits the acquired user ID and password to the touch panel display 3.

In step S13, when the controller 31 in the touch panel display 3 acquires the user ID and the password, the controller 31 displays the user ID and the password in the input form F1 in a display mode in which the user ID and the password cannot be recognized (see FIG. 5). Step S13 is an example of a display control step of the present disclosure.

In step S14, the controller 21 in the server device 2 determines whether the acquired user ID and password match the user ID and the password set to the file X selected by the user. When the acquired user ID and password match the user ID and the password set to the file X, the controller 21 transmits the data of the file X to the touch panel display 3.

In step S15, the controller 31 in the touch panel display 3 releases the password for the file X, and causes the operation display 33 to display the password.

As described above, the information processing system 1 according to the present embodiment causes the touch panel display 3 to display the input form F1 (the first input field) to which input information can be input, acquires the input information to be input in the input form F2 (the second input field) to be displayed on the user terminal 4 when the user terminal 4 becomes communicable, and displays (reflects) the acquired input information in the input form F1. Accordingly, for example, when a password is set for a file in a conference, it is not necessary for the user to operate the input such as the software keyboard displayed on the touch panel display 3 and input the password in the input form F1 displayed on the touch panel display 3 during the conference. Further, the user can input the password into the input form F2 displayed on his/her own user terminal 4. Therefore, the information processing system 1 according to the present embodiment can prevent the input information such as the password from being leaked to another conference participant. Therefore, the information processing system 1 according to the present embodiment can input the input information into the input form F1 while preventing leakage of the input information to be input into the input form F1 on the touch panel display 3.

The present disclosure is not limited to the embodiments described above.

As another embodiment, when the generated access information (two-dimensional code C1) is used and the web page for the input form F1 is accessed, the controller 21 in the server device 2 may prohibit the used access information from being used from the next time and thereafter. That is, the two-dimensional code C1 may be a one-time code that can be used only once.

Further, as another embodiment, when the input information acquirer 213 acquires the input information (user ID and password) or when the input form F1 is not displayed on the touch panel display 3, the controller 21 in the server device 2 may disconnect the communication with the user terminal 4. That is, the server device 2 may be able to communicate with the user terminal 4 only in a period in which the user ID and the password are acquired from the user terminal 4, and may block the communication with the user terminal 4 in a period other than the period.

Further, as another embodiment, the two-dimensional code C1 may further include identification information for the touch panel display 3. In this case, the URL is a link destination address of a web page corresponding to the input form F2 displayed on the touch panel display 3 specified by the identification information. The display controller 214 in the server device 2 displays the user ID and the password acquired by the input information acquirer 213 in the input form F1 on the touch panel display 3 specified on the basis of the identification information included in the two-dimensional code C1. Accordingly, even when a plurality of touch panel displays 3 are provided, it is possible to input the input information using the user terminal 4 on each touch panel display 3.

Further, as another embodiment, the server device 2 may transmit the identification information for the touch panel display 3 to the user terminal 4 by using a short-range communication method such as Bluetooth (registered trademark), Wi-Fi (registered trademark), ultrawideband (UWB), near field communication (NFC), and radio-frequency identification (RFID), instead of the two-dimensional code C1.

Further, as another embodiment, the display controller 214 in the server device 2 may delete the two-dimensional code C1 displayed on the touch panel display 3 when the user ID and the password are acquired by the input information acquirer 213 (see FIG. 5).

Further, as another embodiment, the two-dimensional code C1 may include authentication information. For example, the authentication information is identification information for a user who has an access authority to a file (authorized user ID). For example, when the user reads the two-dimensional code C1 at the user terminal 4, the server device 2 receives an input operation for the user ID from the user. When the received user ID matches the authorized user ID, the server device 2 displays the input form F1 on the user terminal 4. This allows to improve the security for the file. Note that the authentication information may be an encryption key.

Further, as another embodiment, when a user inputs the URL into the address bar on the user terminal 4, the controller 21 in the user terminal 4 may acquire the URL. Then, the controller 21 accesses the acquired URL, and receives the web page for the input form F2 transmitted from the server device 2. According to this configuration, the present disclosure can be applied even when the user terminal 4 does not include the camera 45.

Figure 7:
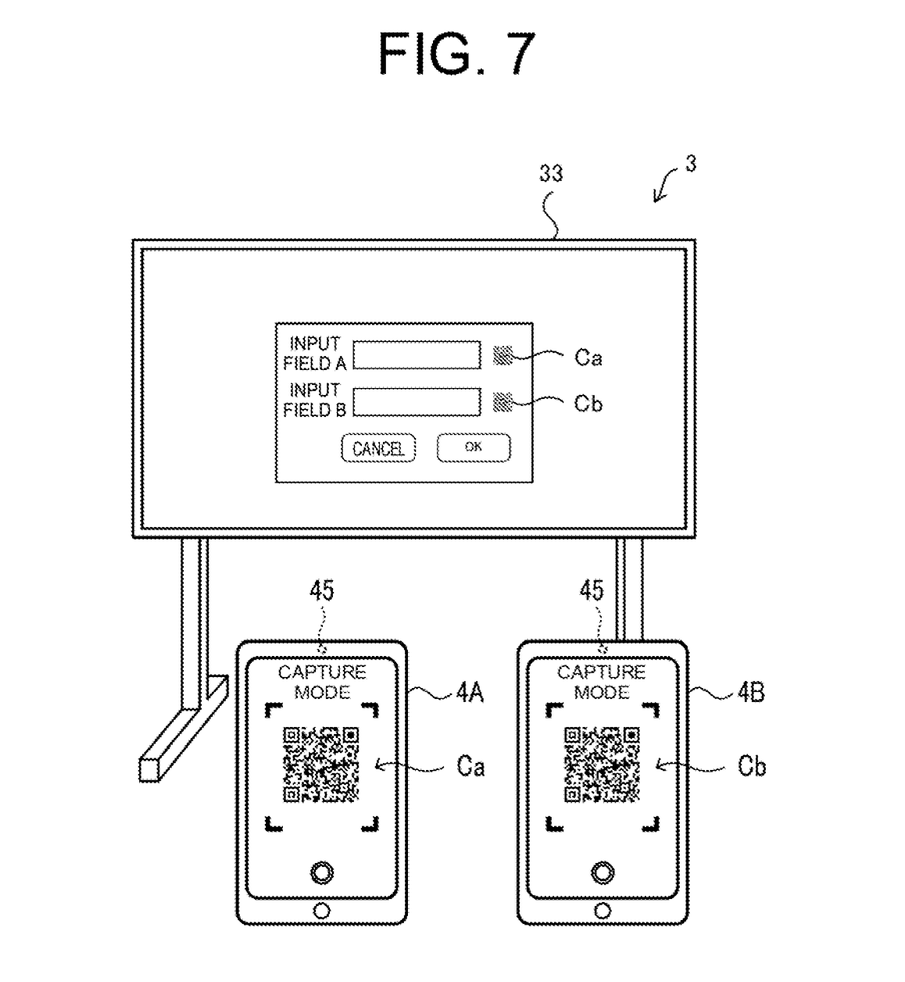
FIG. 7 is a diagram illustrating an example of display screens of the touch panel display and the user terminal according to the embodiment of the present disclosure.

Further, as another embodiment, when the server device 2 displays a plurality of input fields on the touch panel display 3, the server device 2 may generate and display a two-dimensional code C1 different for each input field. Accordingly, the user can individually input the input information for each input field. For example, as illustrated in FIG. 7, the user A reads the two-dimensional code Ca for the input field A on his/her own user terminal 4A, and inputs the input information A into the input field A. Then, the user B reads the two-dimensional code Cb in the input field B with his/her own user terminal 4B, and inputs the input information B into the input field B. That is, the display controller 214 causes the touch panel display 3 to display a plurality of two-dimensional codes corresponding to each of the plurality of input fields, and the input information acquirer 213 acquires the user ID and the password corresponding to the two-dimensional code C1 for each of the two-dimensional codes.

In the embodiments described above, the information processing system 1 corresponds to the information processing system of the present disclosure. However, the information processing system of the present invention is not limited to the information processing system 1. For example, the information processing system of the present disclosure may be configured by the touch panel display 3 alone. Further, the information processing system of the present invention may be configured by the server device 2 and the touch panel display 3. In a configuration in which the server device 2 is omitted, for example, the user terminal 4 and the touch panel display 3 can send and receive various information to and from each other, by installing a dedicated application to the user terminal 4 in order for the user terminal 4 to directly communicate with the touch panel display 3.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An information processing system, comprising:
    at least one processor configured to:
        when detecting access to a first file for which a password is set, generate a first input field for inputting predetermined information set for the first file;
        transmit data of the first input field and data of first access information corresponding to the first input field to a display device, and cause the display device to display the first input field and the first access information;
        when a first user terminal reads the first access information, cause a first input page to be displayed on a display screen of the first user terminal;
        when first information is input on the first input page displayed on the first user terminal, acquire the first information; and
        cause the first information to be displayed in the first input field that is displayed on the display device.

2. The information processing system according to claim 1, wherein
    the at least one processor is further configured to cause the first information to be displayed in the first input field in a display mode in which the first information is not recognizable by another user.

3. The information processing system according to claim 1, wherein
    the at least one processor is further configured to:
        cause the display device to display a second input field and second access information as well as the first input field and the first access information, and
        when a second user terminal reads the second access information, cause a second input page to be displayed on a display screen of the second user terminal.

4. The information processing system according to claim 3, wherein
    the at least one processor is further configured to, when second information is input on the second input page that is displayed on the second user terminal, acquire the second information.

5. The information processing system according to claim 4, wherein
    the at least one processor is further configured to cause the second information to be displayed in the second input field that is displayed on the display device.

6. The information processing system according to claim 1, wherein the first access information is a two-dimensional code comprising a uniform resource locator (URL) for a web page corresponding to the first input page.

7. The information processing system according to claim 6, wherein the first user terminal accesses the first input page by reading the two-dimensional code.

8. The information processing system according to claim 6, wherein
the two-dimensional code further comprises identification information for the display device, and
the at least one processor is further configured to cause the display device, specified based on the identification information in the two-dimensional code, to display the predetermined information in the first input field.

9. An information processing method executable by one or more processors, the information processing method comprising:
when detecting access to a first file for which a password is set, generating a first input field for inputting predetermined information set for the first file;
transmitting data of the first input field and data of first access information corresponding to the first input field to a display device, and causing the display device to display the first input field and the first access information
when a first user terminal reads the first access information, causing a first input page to be displayed on a display screen of the first user terminal;
when first information is input on the first input page displayed on the first user terminal, acquiring the first information; and
causing the first information to be displayed in the first input field that is displayed on the display device.

10. A non-transitory computer-readable storage medium that stores an information storage program, the information storage program causing one or more processors to:
when detecting access to a first file for which a password is set, generate a first input field for inputting predetermined information set for the first file;
transmit data of the first input field and data of first access information corresponding to the first input field to a display device, and cause the display device to display the first input field and the first access information;
when a first user terminal reads the first access information, cause a first input page to be displayed on a display screen of the first user terminal;
when first information is input on the first input page displayed on the first user terminal, acquire the first information; and
cause the first information to be displayed in the first input field that is displayed on the display device.

* * * * *